United States Patent [19]

Groelz

[11] 4,080,991
[45] Mar. 28, 1978

[54] CONTROL VALVE AND SPEED ADJUSTMENT FOR WATER DRIVE IRRIGATION SYSTEM

[75] Inventor: Jay C. Groelz, Phillips, Nebr.

[73] Assignee: Heinzman Engineering, Inc., (Entire), Grand Island, Nebr.

[21] Appl. No.: 684,865

[22] Filed: May 10, 1976

[51] Int. Cl.² ............................................. A01G 25/09
[52] U.S. Cl. ........................... 137/624.13; 137/624.18; 251/45; 137/869; 137/344
[58] Field of Search ............... 251/45, 44; 137/624.13, 137/624.15, 624.18, 624.2, 624.11, 609, 344

[56] References Cited

U.S. PATENT DOCUMENTS

| 269,886 | 1/1883 | Semple | 251/46 |
|---|---|---|---|
| 1,988,026 | 1/1935 | Unger | 251/45 X |
| 2,283,973 | 5/1942 | Criss | 251/46 X |
| 2,772,067 | 11/1956 | Wilson | 251/45 X |
| 3,345,915 | 10/1967 | Dotto | 137/624.13 X |
| 3,805,822 | 4/1974 | Joannon | 251/46 X |
| 3,893,475 | 7/1975 | Hudson | 251/46 X |

Primary Examiner—Alan Cohan
Attorney, Agent, or Firm—Clarence A. O'Brien; Harvey B. Jacobson

[57] ABSTRACT

A control valve for use in conjunction with the control system of water powered field irrigation equipment has a valve housing provided with an inlet opening, an outlet opening, and a flow passage connecting the inlet and outlet openings. The flow path is selectively blocked and unblocked by a valve element actuated by a pilot valve controlled remotely by an operator of the equipment in order to determine the direction of rotation of a drive motor which propels a portion of the equipment about a pivot axis as a function of the position of other portions of the equipment. A fluid actuated motor provided with an eccentrically mounted output cam permits control of the time the end unit of the equipment, which unit controls the operation of other units disposed between the end unit and the pivot axis, is on and off in order to obtain a continuous speed control of the equipment.

8 Claims, 8 Drawing Figures

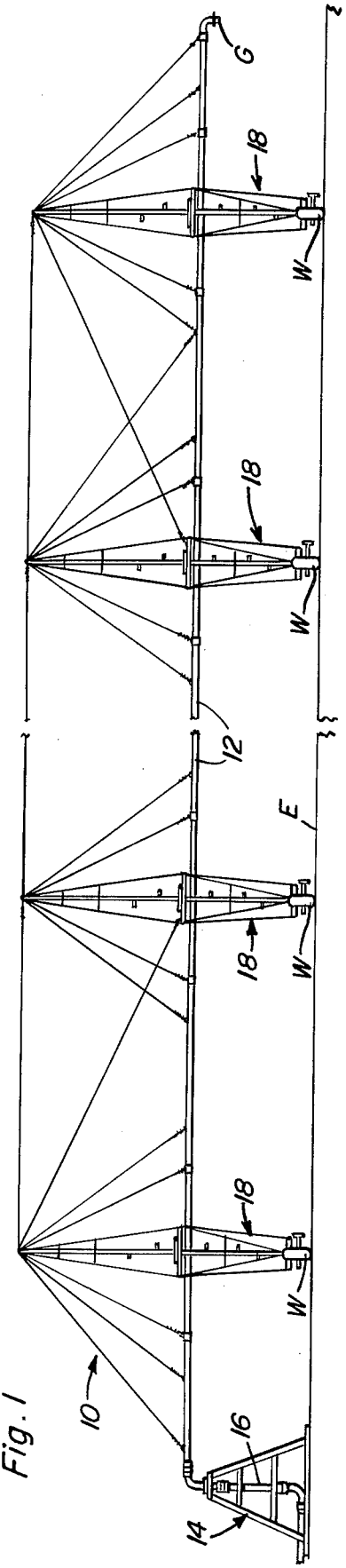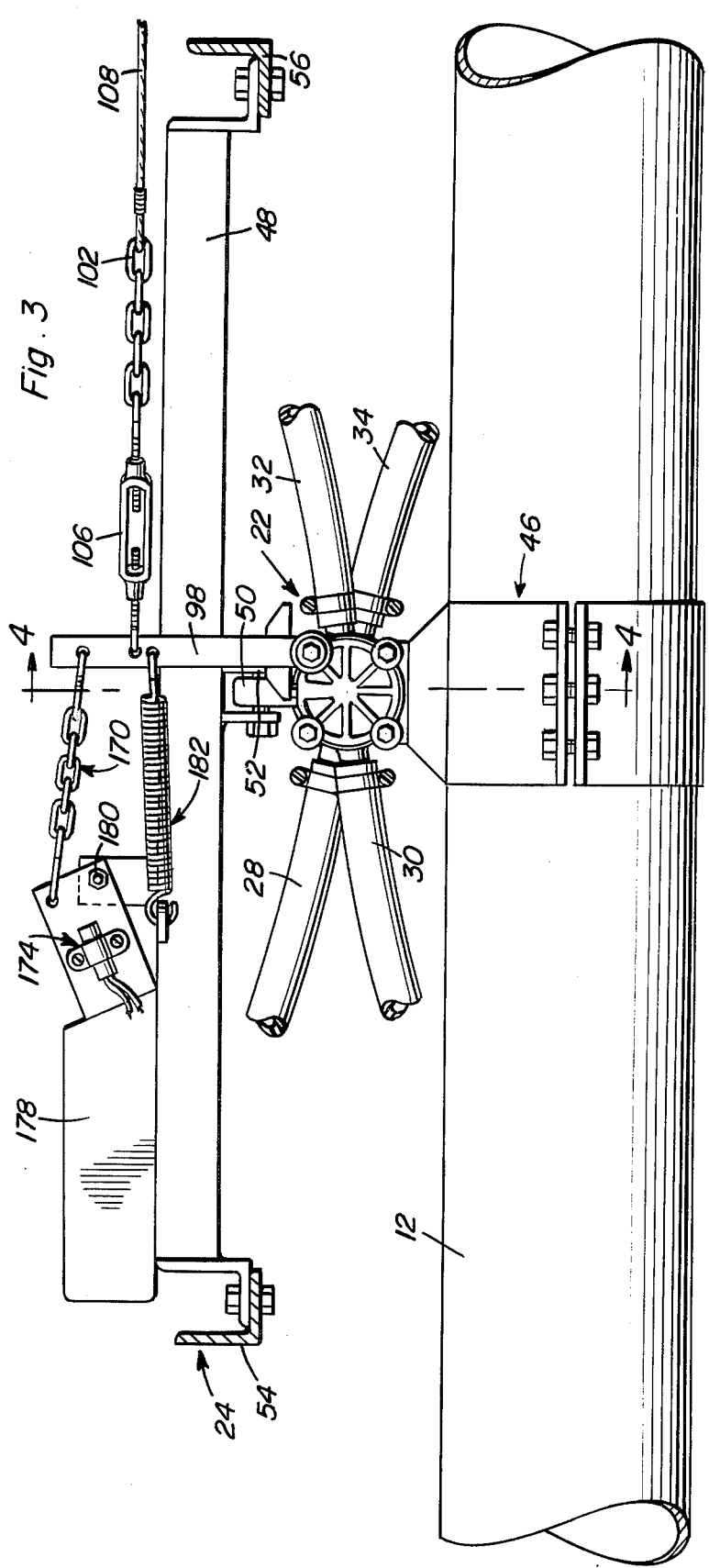

CONTROL VALVE AND SPEED ADJUSTMENT FOR WATER DRIVE IRRIGATION SYSTEM

BACKGROUND OF THE INVENTION

1. Field of the Invention

The present invention relates generally to new and useful improvements in area watering systems wherein a tower supported water pipe travels in a circular path about a central supply point, and particularly to a control valve and associated speed control device for use with the control system of such an area watering system.

2. Description of the Prior Art

The well known and widely employed irrigation devices that employ a water-turbine drive pivot require definite on-and-off modes, with no modulated condition between the definite modes. Conventionally employed is a normally closed poppet valve with a spring in series with the control linkage of the irrigating device. The addition of the spring provides the desired off-on characteristic, but also makes the valve distributing water to the driving turbine quite pressure sensitive. Changing the operating pressure in the system affects the alignment of the various units forming the irrigation system. When it is considered that the self-propelled sprinkler irrigation systems operating around a center pivot can be approximately one-quarter of a mile in length and make a complete rotation in from 24 to 60 hours, it will be appreciated that alignment of the various units forming the total length, or span, of the center pivot system is highly critical. Accordingly, the pivot must be calibrated at a given pressure and this pressure must then be maintained in order to prevent the machine from bowing. If the bow is allowed to become excessive, the pivot can walk in on itself and cause damage to the machine. In practice, however, it has been found impractical to maintain the given calibrated pressure, with the result that changes of alignment of the machine makes it impossible to use the pivot point of the system for control of part circle stop switches and end gun control. Further, a large angle error can exist between the pivot point and the end of the machine.

I am aware of the following patents that may be pertinent to the invention:

U.S. Pat. No. 3,246,848 to E. A. Bowers filed on Apr. 19, 1966

U.S. Pat. No. 3,255,968 to R. R. Stafford filed on June 14, 1966

U.S. Pat. No. 3,446,434 to F. J. Smith, Jr. et al filed on May 27, 1969

SUMMARY OF THE INVENTION

It is an object of the present invention to provide a control valve which is not pressure sensitive.

It is another object of the present invention to provide a control valve capable of cycling quickly between on-and-off modes without modulating partially on or off and eliminate tracking in water turbine operation caused by lack of full pressure of water being thrown against the blades of the motor turbine and not being thrown out away from the wheel tracks of the particular unit of the center pivot system.

It is yet another object of the present invention to provide a control system for a water powered center-pivot field irrigation system which permits control of the speed of the end unit of the system.

These and other objects are achieved according to the present invention by providing a control system including a control valve having: a valve housing provided with an inlet opening, an outlet opening, and a flow passage connecting together the inlet opening and the outlet opening, the valve element being provided with an orifice; and a pilot valve arranged for regulating flow of fluid through the orifice of the valve element in order to move the valve element between a position blocking flow from the inlet opening to the outlet opening, and a position unblocking flow through the flow passage between the inlet opening and the outlet opening.

According to a particularly advantageous feature of the present invention, the valve element is a diaphragm movably disposed in the flow passage between the inlet opening and the pilot valve for selectively engaging a valve seat provided in the flow passage and blocking the passage at a point between the inlet opening and the outlet opening.

The pilot valve preferably includes a control port provided in the valve housing, and a valve assembly including an arm pivotally mounted on the valve housing and provided with a projecting member selectively disposable blocking and unblocking the control port as the arm pivots. The arm is connected to the control system of the irrigation equipment as by suitable cables.

Preferably, the valve housing includes a pair of spaced outlet openings each provided with associated valve elements and pilot valves, such that one of the outlet openings is unblocked by a clockwise rotation of the arm of the pilot valve associated with the particular outlet opening, and the other outlet opening is unblocked by a counterclockwise rotation of the arm of the pilot valve associated with that particular outlet opening. In this manner, appropriate manipulation of cables connected to the arms of the pilot valves permits remote control of each of the control valves of a center pivot irrigation equipment by an operator positioned at, for example, the center pivot of the equipment.

The objects of the present invention are further achieved by the provision of a motor speed control device having: a fluid actuated motor including an eccentrically mounted output cam; a speed control push arm mounted on the cam; a pivotally mounted rocker arm connected to the push arm for pivotal movement by the push arm; and a valve control arrangement connected to the rocker arm and to an associated drive motor control valve of a center pivot irrigating system, and the like, for regulating the timing of the on-and-off modes of the control valve. The speed control device can further include a reversing lever connected to the rocker arm for selectively shifting the rocker arm relative to the fluid actuated timing motor and to links connecting the rocker arm to the control valve of the drive motor for reversing the direction of rotation of the drive motor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic, elevational view showing a center pivot field irrigating system with which the present invention can be employed.

FIG. 3 is a fragmentary, enlarged, sectional view taken generally along the line 3—3 of FIG. 2.

DESCRIPTION OF THE PREFERRED EMBODIMENTS

Figure 2:
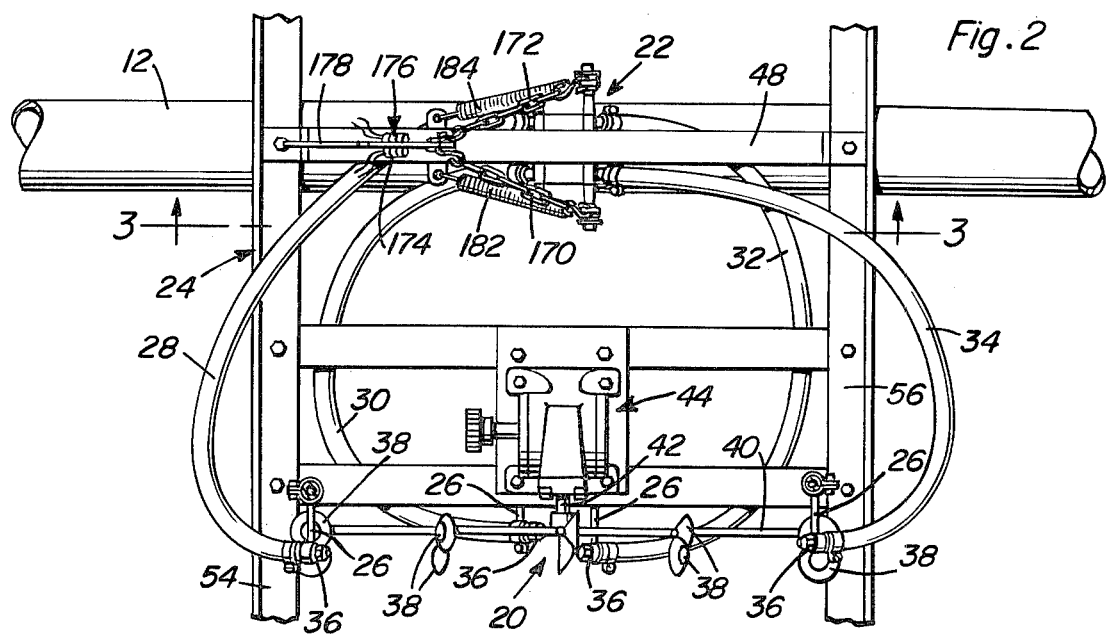
FIG. 2 is a fragmentary, enlarged, top plan view showing the motor drive unit of one of the towers of the irrigating system shown in FIG. 1.

Referring now more particularly to FIGS. 1 and 2 of the drawings, a self-propelled irrigation system 10 comprises an elongated water-distributing pipe 12 pivotally mounted at one end 14 in engagement with a water supply carried through conduit 16 and supported throughout the length thereof by a plurality of mobile support towers 18 selectively propelled by water-powered motors 20. Although not specifically shown in FIG. 1, each tower 18 is provided with a motor 20, with the outermost tower 18 running continuously at a predetermined speed and the towers 18 inwardly of the outermost tower 18 being provided with intermittent movement through a, for example, cable system. This general arrangement of motors and cables is generally conventional, and is more specifically disclosed in U.S. Pat. Nos. 3,623,663 and 3,843,058, issued Nov. 30, 1971 and Oct. 22, 1974, respectively, to Walter J. Koinzan.

As can be appreciated, the movement of each tower 18 controls, through the aforementioned cable system, the movement of the tower 18 immediately inward of the particular tower 18 through a selective opening and closing of water distributing valves. Further, the apparatus can be reversed, through the same aforementioned cable system, and incorporates an automatic cut-off system should excessive misalignment occur.

In order to obtain more precise intermittent operation of the motors 20 which propel system 10, it is proposed to provide a control valve 22 which achieves more definite on-off modulation than possible with prior control valves used with such systems. In this manner, not only can the intermittent operation of the motors 20 associated with towers 18 inward of the end tower 18 of system 10 be made more precise, but the motor 20 associated with the end tower 18 can also be operated intermittently in order to obtain a precise speed control of the end motor 20, the speed of which motor governs the speed of rotation of system 10.

Each drive motor 20 is mounted on a framework 24 which partially forms the associated tower 18 of system 10. Secured to framework 24 are a plurality of hangers 26, four hangers being provided in the usual situation, which support the nozzle-ends of hoses 28, 30, 32, and 34, each of which hose terminates in a conventional nozzle 36. More specifically, hangers 26 are disposed on framework 24 so as to direct a flow of water, or other suitable fluid, from the nozzles 36 into associated ones of the cups 38 provided at the outer ends of a, for example, spoke-like rotor 40 which is connected by a shaft 42 to a conventional gear box 44 in order to form a drive motor 20. The output of each gear box 44 is connected to the associated wheel W of the respective tower 18 in a conventional manner commonly employed and therefore not disclosed herein. As can be readily seen in FIG. 2, cups 38 are divided into two sets, one disposed for clockwise rotation of rotor 40, and the other set disposed for counterclockwise rotation of the rotor 40. Accordingly, hoses 28 and 32 are disposed so as to rotate the rotor 40 in a clockwise direction as viewed in FIG. 2, while hoses 30 and 34 are disposed for rotating rotor 40 in a counterclockwise direction as seen in FIG. 2. Thus, by distributing water, and the like, to either the set of hoses 28, 32 or 30, 34, the rotor 40 can be turned in either the clockwise or counterclockwise direction, which accordingly reverses the direction of rotation of the wheels W being driven by rotor 40.

Figure 4:
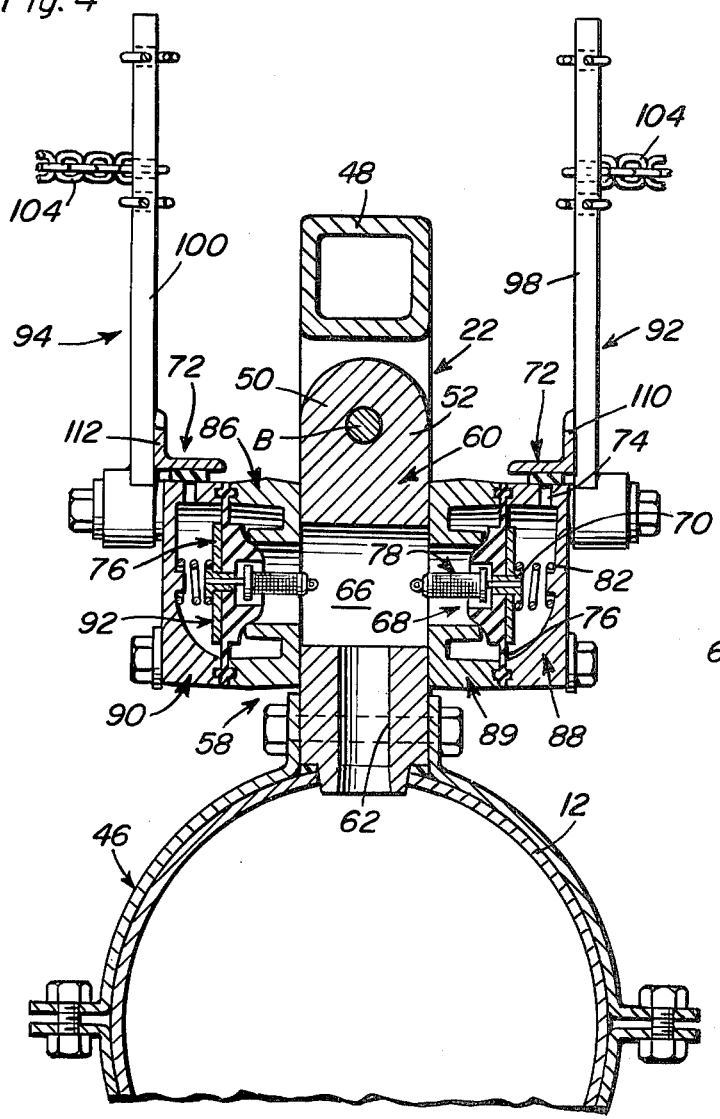
FIG. 4 is a fragmentary, enlarged, sectional view taken generally along the line 4—4 of FIG. 3.
Figure 5:
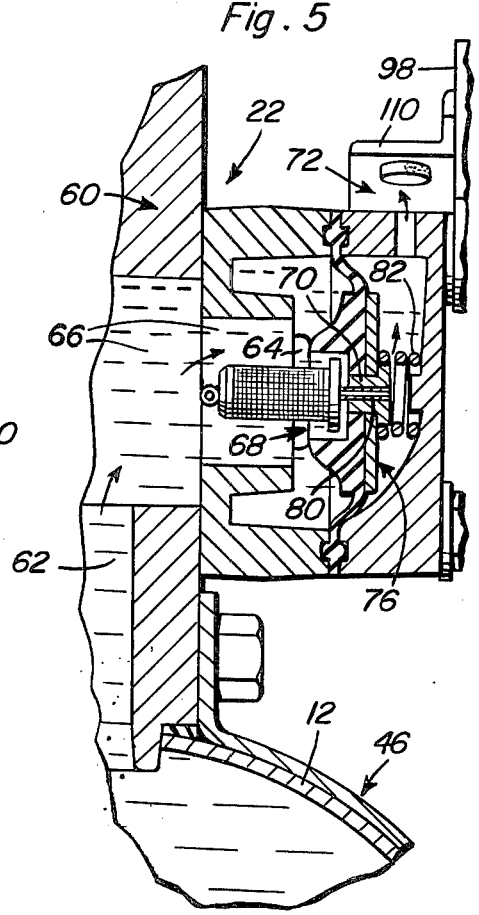
FIG. 5 is a fragmentary, enlarged, sectional view showing a portion of the right-hand side of FIG. 4.

Referring now more specifically to FIGS. 3 through 5 of the drawings, control valve 22 according to the invention is illustrated as being secured to the water-distributing pipe 12 as by a conventional flanged clamp 46, and is connected to a pipe hanger bracket by means of a tongue 50 forming part of the valve 22 and inserted between a pair of downwardly depending ears 52 of bracket 48 so as to permit securing of the tongue 50 to the ears 52 as by the illustrated bolt and nut. Bracket 48 is itself supported by a pair of substantially parallel, spaced angles 54 and 56 which form part of the framework 24. By this arrangement, control valve 22 is rigidly and securely mounted at its appropriate station within a tower 18.

Control valve 22 includes a valve housing 58 partially formed by a valve manifold 60 provided with an inlet opening 62. Housing 58 is also provided with two pairs of outlet openings 64 spaced from one another on axially opposed sides of manifold 60, connected to inlet opening 62 as by flow passage 66.

A pair of valve elements 68, one associated with each pair of outlet openings 64, are disposed in the valve housing 58 for selectively blocking and unblocking the flow passage at a point between the inlet opening 62 and the associated pair of outlet openings 64. Each valve element 68 is provided with an orifice 70, the flow through which orifice 70 is controlled by a respective one of a pair of pilot valves 72. More specifically, the associated pilot valve 72 regulates the flow of water or other fluid through the orifice 70 of a valve element 68 along the flow passage 66 and moves the valve element 68 between a position blocking flow from the inlet opening 62, as shown in FIG. 4, and a position unblocking flow from the inlet opening 62 to the associated outlet opening 64, as shown in FIG. 5. Each pilot valve 72 includes a control port 74 provided in the associated portion of valve housing 58, with the corresponding valve element 68 being disposed between the inlet opening 62 and the control port 74.

Advantageously, each valve element 68 is a diaphragm 76 including, in addition to a centrally disposed orifice 70, a filter 78 in communication with the orifice 70 and arranged for filtering fluid passing through the orifice 70. Diaphragm 76 includes a stem 80 which defines the orifice 70 and connects the filter 78 to the diaphragm 76 so as to place the filter 78 in communication with the orifice 70, and the diaphragm 76 is further advantageously provided with a compression spring 82, and the like, which biases diaphragm 76 toward the position blocking the flow passage 66 between inlet opening 62 and outlet openings 64 associated with the particular diaphragm 76.

Each of the diaphragms 76, and associated pilot valves 72, is contained in respective valve bodies 84 and 86 terminated with valve caps 88 and 90. Thus, valve body 84 and associated valve cap 88 form one valve unit in cooperation with the associated diaphragm 76 and control port 72, while valve body 86 and cooperating valve cap 90 form another valve unit containing a diaphragm 76. For clarity, the valve element formed by the diaphragm 76 associated with the unit formed by valve body 86 and valve cap 90 has been designated by the reference numeral 92.

As can be seen from FIGS. 4 and 5 of the drawings, the control port 74 of each pilot valve 72 is provided in a respective one of the valve caps 88 and 90, while the outlet openings 64 are provided in the respective valve bodies 84 and 86. It will be appreciated, however, that while each valve body 84, 86 is shown as being provided with a pair of outlet openings 64, only one outlet opening 64 is required in each valve unit in order to direct the actuating fluid onto the rotor 40 of an associated drive motor 20.

In addition to the control port 74, each pilot valve 72 includes a valve assembly 94, 96 each comprising a crank 98, 100 pivotally mounted on the associated valve cap 88, 90 and connected to a respective chain 102, 104 forming part of the cable control system for the irrigating system 10. Turnbuckles 106 (FIG. 3) selectively connect the chains 102 and 104 to a cable such as cable 108 which permits actuation of the pivotally mounted cranks 98 and 100.

Each crank 98 and 100 is provided with a respective projecting member 110 and 112 disposed for selectively blocking and unblocking the corresponding control port 74 as the crank is pivoted and consequently control the flow of fluid through the orifices 70.

In operation, when a pilot valve 72 is open, the water or other actuating fluid enters the valve cap 88, 90 through the orifice 70 provided in, for example, the center of the diaphragm 76 at a slower rate than it can escape through the pilot valve 72. Inlet water pressure forces the diaphragm 76 away from its associated seat S, allowing full flow through the outlet opening 64. This action also compresses the spring 82. A small quantity of water is released from the control port 74 the full duration that the valve unit is on. This is not a problem since the very small amount of water released simply drips to the soil being irrigated.

When the pilot valve 72 is closed, the spring 82 initially moves the diaphragm 76 toward the closed position. This partially closed valve unit creates a pressure difference between the inlet opening 62 and the outlet opening 64, which in turn allows the water that enters through the orifice 70 to build pressure behind the diaphragm 76. This pressure differential between the valve cap 88, 90 side of the diaphragm 76 and the outlet pressure causes the diaphragm 76 to seal off the incoming water by engaging with the valve seat S. The diaphragm 76 will remain closed until the associated pilot valve 72 is opened.

Figure 6:
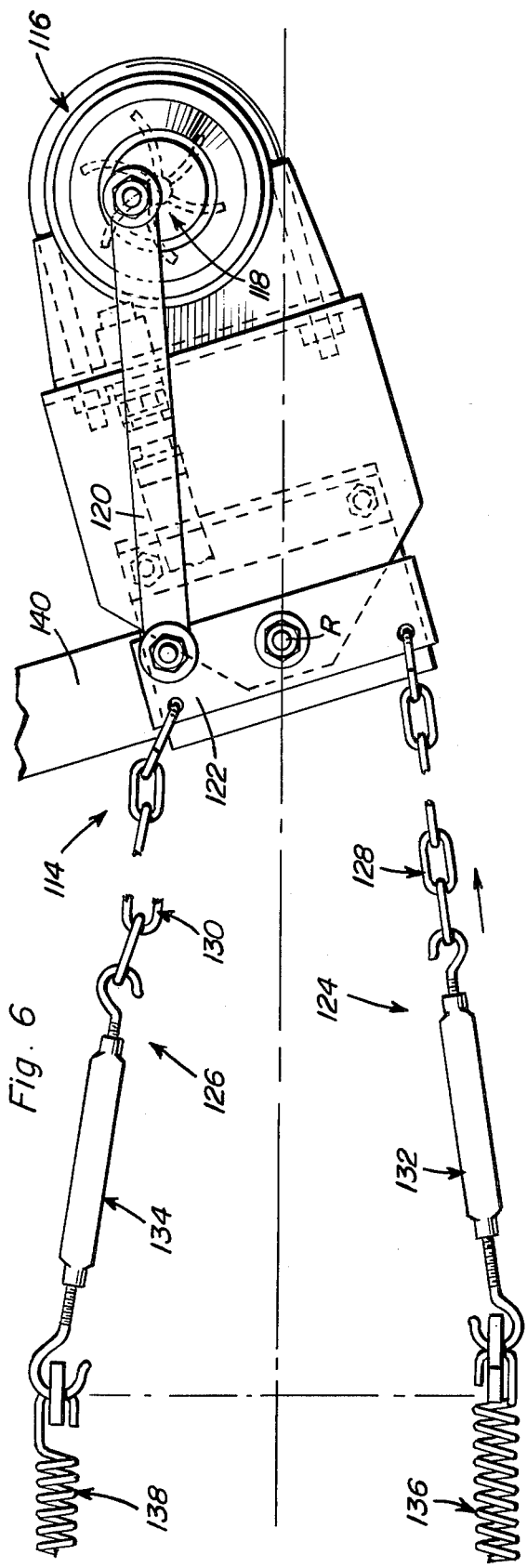
FIG. 6 is a fragmentary, top plan view showing a drive motor control valve speed control device according to the present invention.
Figure 7:
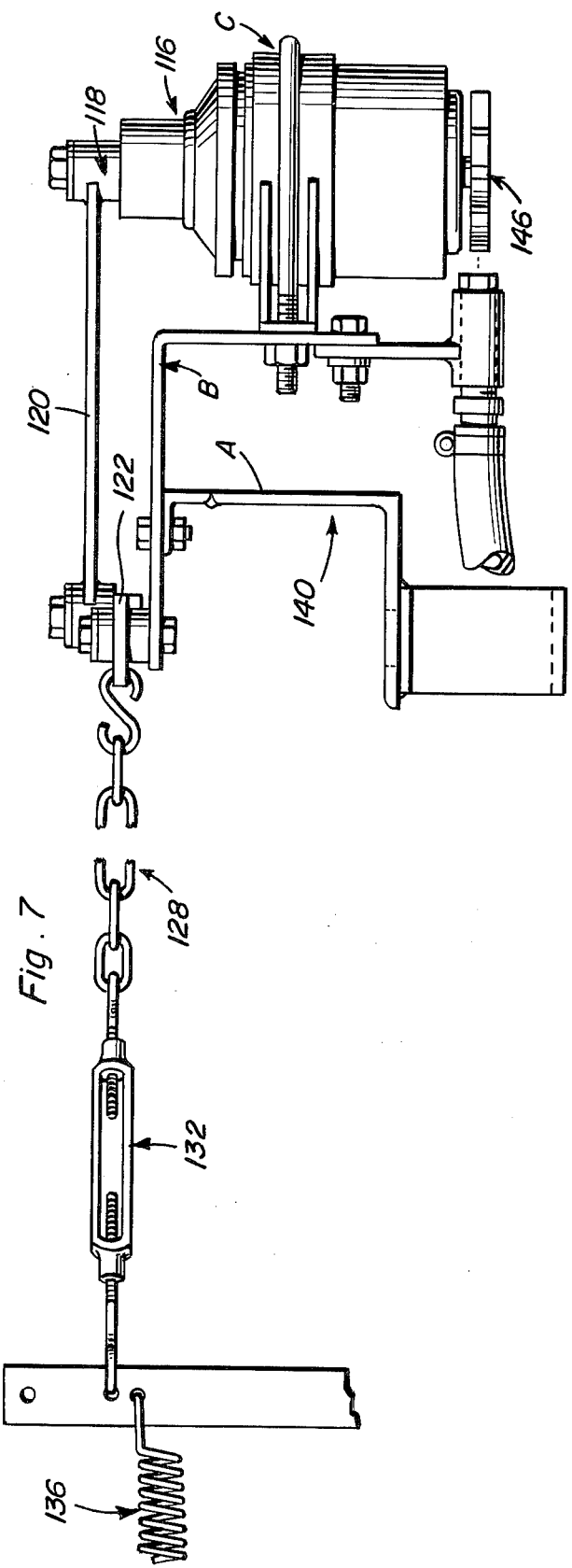
FIG. 7 is a fragmentary, elevational view showing the speed control device of FIG. 6.

FIGS. 6 and 7 of the drawings disclose a speed control device 114 according to the invention which can be employed to control the timing of control valve 22. That is, device 114 determines the periods of time in which valve 22 is in its on-and-off modes.

Device 114 includes a fluid actuating timing motor 116 having an eccentrically mounted output cam 118. Pivotally mounted on cam 118 is one end of a push arm 120, the other end of which is connected to a pivotally mounted rocker arm 122 at a point spaced from the pivot point R of the rocker arm 122 in order to cause swinging, or pivotal, movement of arm 122 when motor 116 is rotating. A pair of valve control links 124 and 126 are connected to the end portions of rocker arm 122 and to an associated drive motor control valve 22 for regulating the timing of the control valve 22.

More specifically, each link 124 and 126 is connected to rocker arm 122 such that one link 124, 126 is arranged on one side of the pivot R which pivotally mounts the rocker arm 122 and the other link 126, 124 is arranged on the other side of the pivot R. The control valve 20 has two sides, as discussed above, and each of the links 124 and 126 is connected to a respective one of the sides of the control valve 22 as by a flexible member represented in the drawings by the chains 128 and 130. Turnbuckles 132 and 134 are disposed in the chains 128 and 130, respectively, for permitting adjustment of the chains in order to provide the desired amount of tension between the pilot valve actuating cranks of valve 22 and the rocker arm 122. Springs 136 and 138, which can be the illustrated coiled tension springs, provide a take-up within the links 124 and 126 which assures proper tension between rocker arm 122 and valve 22.

A reversing lever 140 is advantageously connected to the rocker arm 122 for shifting the rocker arm 122 relative to the motor 116 and reversing the direction of rotation of the associated drive motor 20 by closing one side of valve 22 and opening the other side. Lever 140 is connected to a cable 142 (FIG. 8) which extends to the pivot end 14 of pipe 12 in order to permit remote operation of the system.

As can be seen from FIG. 7, a hose 144 connected to a suitable source of fluid under pressure, such as to pipe 12, directs a stream of fluid onto the blades 146 of a rotor disposed at the bottom portion of motor 116. Rotation of blades 146 will cause cam 118 to follow a circular path which oscillates push arm 120 and rocks the rocker arm 122. One of the links, specifically link 126 as shown in FIG. 6, remains loose at any time during operation of device 114. In this manner, link 124 will be in tension sufficient enough to be moving one side of a valve 22 between its on-and-off mode in order to decrease the effective pressure of water being discharged through that particular side of the valve 22 and onto the rotor 40. The link 126 will remain loose, or without sufficient tension, to move the other side of the valve 22 from its off mode. Thus, by moving the lever 140 sufficiently to make link 124 loose and link 126 of sufficient tension to move the side of the valve 22 associated therewith from the off mode to the on mode and back to the off mode in a predetermined time sequence, the drive motor 20 associated with the control valve 22 will be driven in the reverse direction from the direction in which the drive motor will be rotated when device 114 is arranged as shown in FIG. 6 of the drawings.

Figure 8:
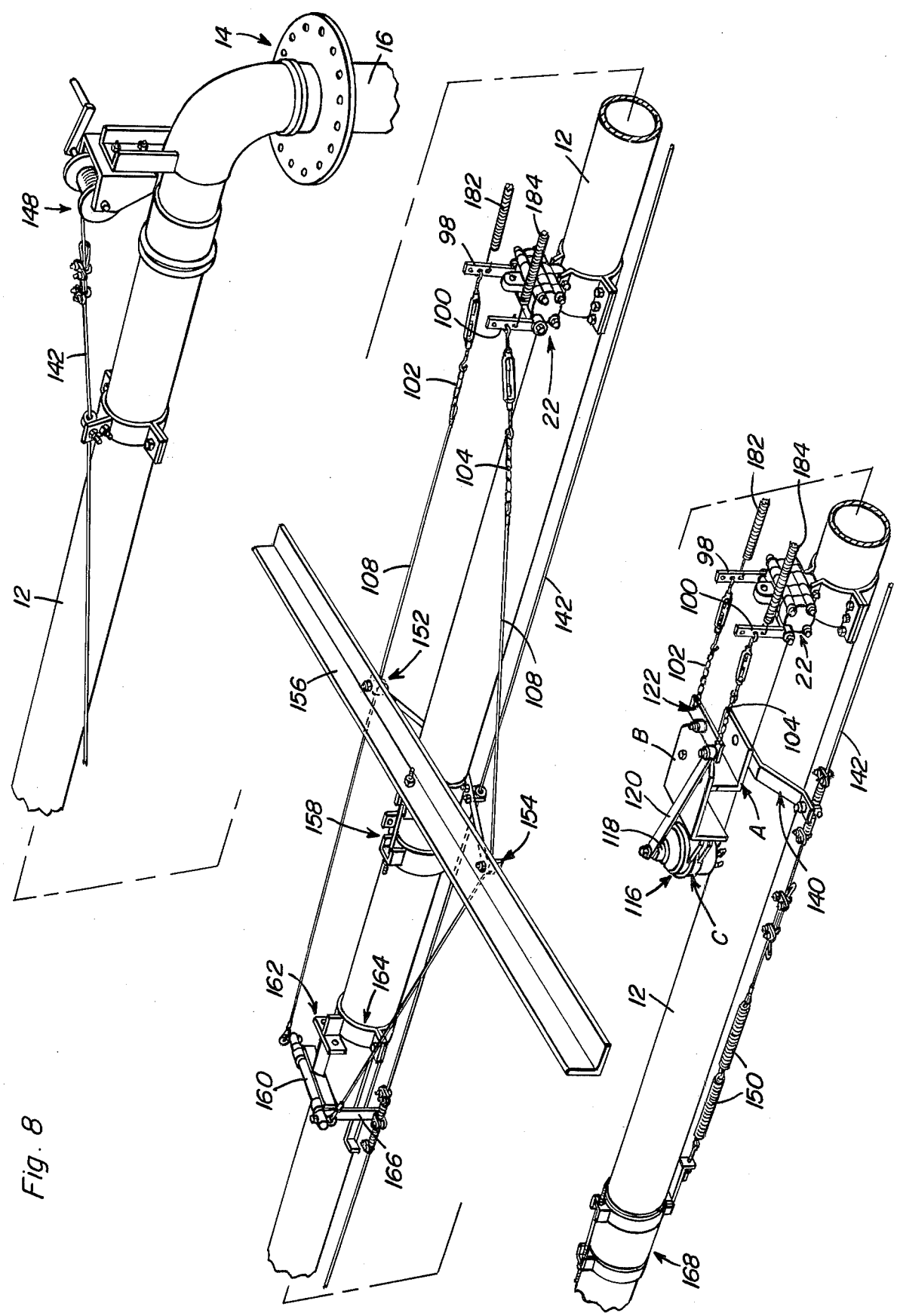
FIG. 8 is a fragmentary, perspective view showing the control valve and speed control systems of the present invention mounted on a center pivot field irrigation apparatus.

Referring now more specifically to FIG. 8 of the drawings, the overall arrangement of the valves 22 and speed control device 114 on the water discharge pipe 12 is illustrated. Adjacent the pivot end 14 of pipe 12 is disposed a, for example, hand-driven winch 148 on which is wound one end of the cable 142. Thus, by winding and unwinding cable 142 on winch 148 against the bias of springs 150, with cable 142 being appropriately guided by suitable guide elements, the valves 22, and accordingly the associated drive motors 20, can be switched from one direction of operation to the other.

Guides 152 and 154 provided on an angle 156 secured on pipe 12 as by clamp 158 guide cables 108 and 108' between the corresponding actuating cranks 98 and 100 of pilot valve 74 of a control valve 22 to a reversing arrangement including a rod 160 rotatably mounted on a bracket 162 secured to pipe 12 as by a conventional clamp 164. Attached to rod 160 for rotating same is an arm 166 attached to the cable 142 such that movement of cable 142 as by manipulation of winch 148 causes both arm 166 and lever 140 to be manipulated in such a manner as to cause reversal of a drive motor 20 associated with a particular control valve 22, due to the closing of one side of valve 22 and opening of the other side.

A clamp 168 secures the outward end of cable 142 to the pipe 12. Further, springs in addition to those springs designated 150 are employed in cable 142 in conjunction with the connection of cable 142 to the lever 140 and the arm 166 in order to provide a resilient connection between the cable 142 and the actuating elements.

Referring again to FIGS. 2 and 3 of the drawings, a chain 170, 172 connects a respective crank 98, 100 to a plate having mounted thereon a respective mercury switch 174, 176, and the like. The plate upon which the switches 174 and 176 are mounted is a portion of a flag 178 pivotally mounted at 180 so that an excessive pull on cable 108, 108' so as to move the cranks 98, 100 beyond a certain point will cause chains 170, 172 to pull the flag 178 about pivot 180 and result in the switches 174 and 176 to shutdown the control system. As will be appreciated, such over-extension of an arm 98, 100 can result when the various units represented by towers 18 become more than a predetermined amount in misalignment with respect to a line drawn between pivot end 14 and the gun end G of pipe 12, thus extending one of the cables 108, 108' more than a predetermined amount.

Springs 182 and 184 are advantageously connected between lugs provided on bracket 48 and apertures provided in cranks 98 and 100 in order to bias the cranks 98 and 100 in the direction opposite to the direction in which a bias is exerted on the cranks 98 and 100 by the cables 108 and 108'. In other words, the springs 182 and 184 provide a restoring force for the cranks 98 and 100.

In addition to the use of the speed control device 114 on a self-propelled irrigation system 10, and the like, it is also possible to use the device 114 in other irrigation systems, and generally wherever impulse turbine drives are employed. For example, device 114 may be employed with a traveler-hose reel combination traveling gun to drive a rotating spraying head at variable speeds.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in conjunction with a control system of water powered field irrigation equipment, a control valve comprising, in combination:
   (a) a valve having a valve cap and a housing provided with an inlet opening, an outlet opening, and a flow passage connecting the inlet opening to the outlet opening;
   (b) a valve element means including a diaphragm movably disposed in the valve housing for selectively blocking flow between the inlet opening and the outlet opening, the diaphragm being provided with an orifice;
   (c) pilot valve means for regulating flow of fluid through the orifice and moving the valve element between a position blocking flow from the inlet opening to the outlet opening, and a position unblocking flow from the inlet opening to the outlet opening, the pilot valve means including a control port provided in the valve cap, with the diaphragm being disposed between the inlet opening and the control port, and a valve assembly including a crank pivotally mounted on the valve cap and provided with a projecting member selectively blocking and unblocking the control port as the crank pivots, the crank being connected to a control system of the irrigation equipment; and
   (d) a motor speed control device connected to the control valve, the control device comprising, in combination:
   (1) a fluid actuated timing motor including an eccentrically mounted output cam;
   (2) a speed control push arm mounted on the cam;
   (3) a pivotally mounted rocker arm connected to the push arm for pivotal movement thereby; and
   (4) valve control means connected to the rocker arm and to the crank of the control valve for regulating the timing of the blocking and unblocking of the outlet opening of the control valve.

2. A structure as defined in claim 1, wherein the diaphragm includes a filter in communication with the orifice for filtering fluid passing through the orifice.

3. A structure as defined in claim 1, wherein the valve housing includes, in combination:
   (1) a valve manifold provided with the inlet opening and with a valve seat, the valve element selectively engaging the valve seat;
   (2) a valve body mounted on the valve manifold and provided with the outlet opening; and
   (3) said valve cap mounted on the valve body.

4. A structure as defined in claim 3, wherein the diaphragm includes a filter in communication with the orifice for filtering fluid passing through the orifice.

5. A structure as defined in claim 1, wherein the valve housing includes two valve bodies and two valve caps mounted on the valve manifold, a valve body and a valve cap connected to one another to form a set mounted on the valve manifold and extending away from the other set of a valve body and a valve cap.

6. A structure as defined in claim 1, wherein the valve housing is provided with a pair of outlet openings and includes a pair of valve elements associated with respective ones of the outlet openings, and further including a reversing lever connected to the rocker arm for shifting the rocker arm relative to the timing motor and causing one of the valve elements of the control valve to move to a flow passage blocking position from an unblocking position, and the other of the valve elements of the control valve to move to a flow passage unblocking position from a flow passage blocking position in order to reverse the direction of rotation of a drive motor associated with the control valve.

7. A structure as defined in claim 1, wherein the valve control means includes a pair of links connected to the rocker arm, one link being arranged on one side of a pivot which pivotally mounts the rocker arm and the other link arranged on the other side of the pivot, the links being connected to the pilot valve means.

8. A structure as defined in claim 7, wherein the valve housing a provided with a pair of outlet openings and includes a pair of valve elements associated with respective ones of the outlet openings, the pilot valve means including a pair of pilot valves associated with the valve elements, with each of the links being connected to a respective one of the pair of pilot valves, and further including a reversing lever connected to the rocker arm for shifting the rocker arm relative to the timing motor and causing one of the valve elements of the control valve to move to a flow passage blocking position from an unblocking position, and the other of the valve elements of the control valve to move to a flow passage unblocking position from a flow blocking position in order to reverse the direction of rotation of a drive motor associated with the control valve.

* * * * *